March 31, 1953   B. L. EASTMAN   2,633,154
VALVE
Filed Nov. 23, 1946   2 SHEETS—SHEET 1
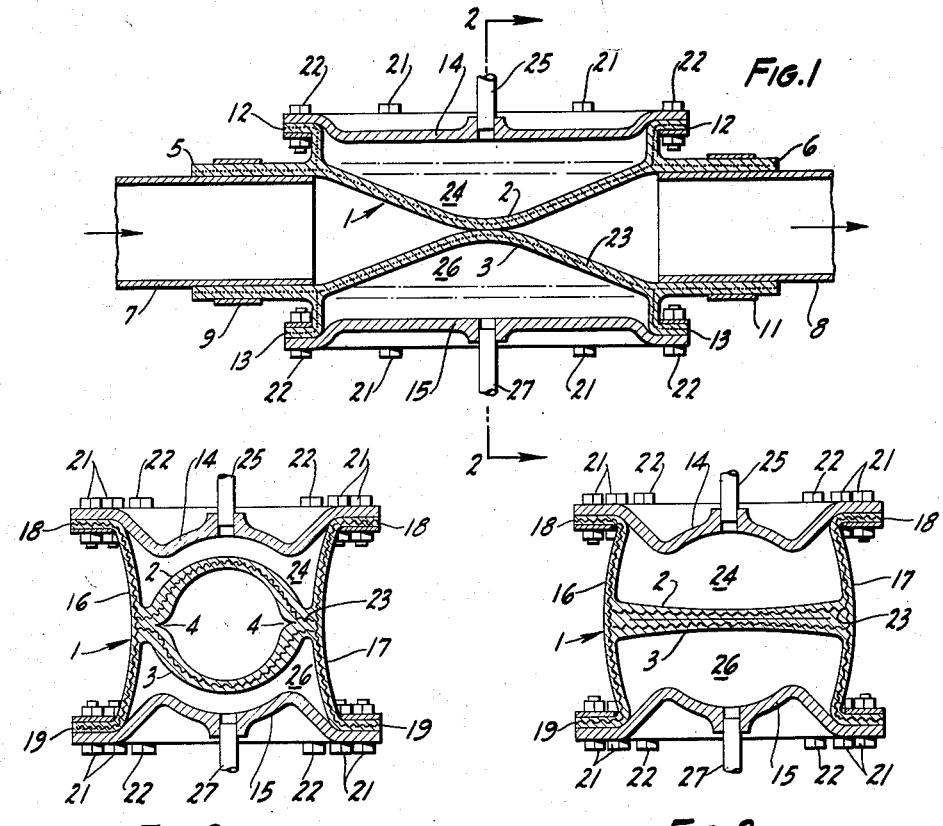
INVENTOR.
BYRON L. EASTMAN
BY
Mellin + Hanscom
ATTORNEYS March 31, 1953     B. L. EASTMAN     2,633,154
VALVE
Filed Nov. 23, 1946     2 SHEETS—SHEET 2
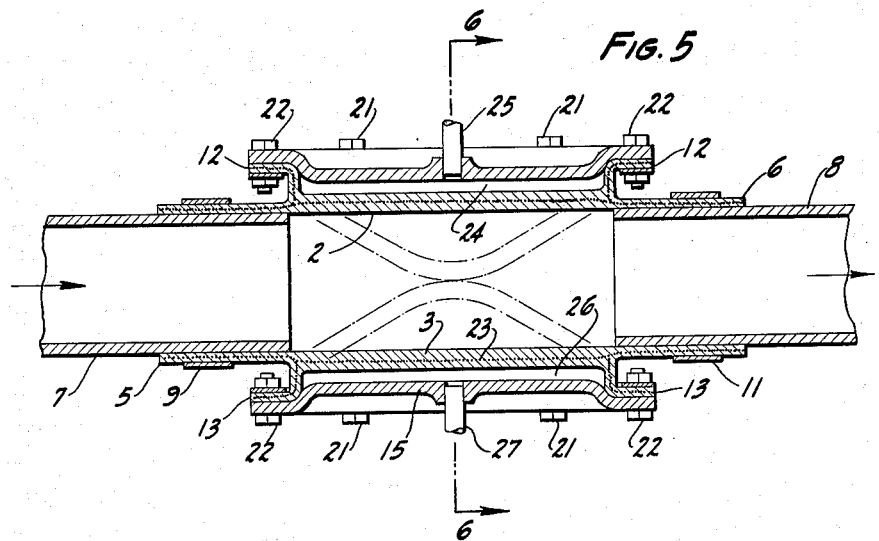
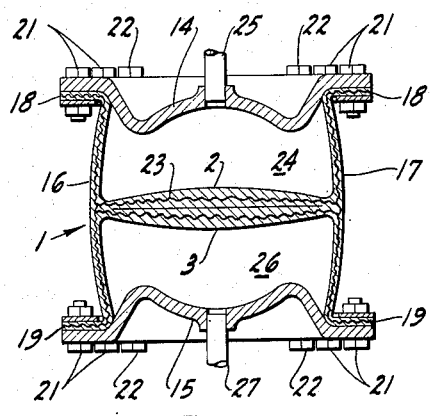
FIG.7
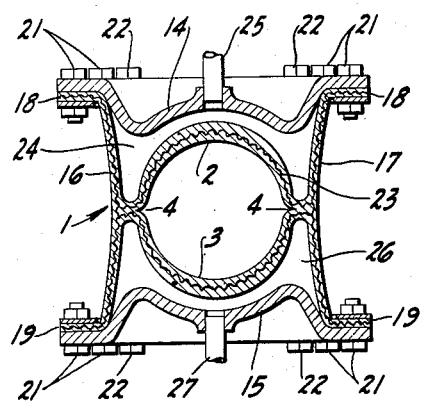
FIG.6
INVENTOR.
BYRON L. EASTMAN
BY
Mellin & Hanscom
ATTORNEYS Patented Mar. 31, 1953

2,633,154

UNITED STATES PATENT OFFICE 2,633,154

VALVE

Byron L. Eastman, Nevada City, Calif.

Application November 23, 1946, Serial No. 711,981

3 Claims. (Cl. 137—688)

This invention relates in general to valves, and more particularly to a valve of the pinch type suitable for controlling the flow of solid laden fluids or solids in a dry but flowable state.

Pinch valves normally include a section of flexible tubing and some means for pinching or pressing together the diametrically opposed sides of the tubing. While for some purposes valves of this type are quite satisfactory, they are not suitable for controlling the flow of solids or solid laden liquids, since the tube takes the form of an elongated figure eight when compressed. Although the total open cross sectional area of the tube in such a valve may be sufficient to permit a considerable flow of liquid, the opening is of such form as to arrest the passage of solids larger than the relatively narrow width of the opening.

In general, the object of this invention is the provision of an improved valve wherein a conduit formed by two overlying and complementary diaphragms is always maintained in substantially circular cross section regardless of the extent to which it is closed and which closes progressively from two diametrically opposed points.

More specifically, the object of this invention is the provision of a valve including a pair of overlying flexible diaphragms sealed to each other along opposed edges and enclosed in a chamber defined by a pair of opposed rigid walls and by a pair of flexible walls, the connected edges of said diaphragms being also connected to said flexible walls intermediate the edges thereof.

The invention possesses other advantageous features, some of which with the foregoing will be set forth at length in the following description where those forms of the invention which have been selected for illustration in the drawings accompanying and forming a part of the present specification are outlined in full. In said drawings two forms of the invention are shown, but it is to be understood that it is not limited to such forms, since the invention as set forth in the claims may be embodied in a plurality of forms.

Referring to the drawings:

Fig. 1 is a longitudinal midsection taken through a valve embodying the objects of my invention, this valve being shown in full lines in its normal closed position and in dot-dash lines in its open position.

Fig. 2 is a transverse vertical midsection taken on the line 2—2 of Fig. 1.

Fig. 3 is a section similar to that illustrated in Fig. 2 showing the valve in its open or dilated position.

Fig. 4 is a top plan view of the valve illustrated in Figs. 1, 2 and 3.

Fig. 5 is a longitudinal midsection taken through a modification of my valve wherein the diaphragms are normally in their open position rather than in their closed position.

Fig. 6 is a transverse vertical midsection taken on the line 6—6 of Fig. 5.

Fig. 7 is a section similar to that illustrated in Fig. 6 showing the diaphragms in their closed position.

The valve shown in Figs. 1, 2, 3 and 4, as well as that shown in Figs. 5, 6 and 7, includes a conduit 1 defined by a pair of overlying flexible diaphragms 2 and 3 joined at their lateral edges as at 4. The ends 5 and 6 of the conduit 1 are of circular cross-sections and can be slipped over inlet and outlet pipes 7 and 8 and sealed thereto by conventional clamping rings 9 and 11. Formed intermediate the ends of the conduit 1 are top and bottom flanges 12 and 13.

Surrounding the major central portion of the conduit 1 is a chamber defined by dished rigid top and bottom walls 14 and 15 and by flexible resilient side walls 16 and 17, provided respectively with outwardly extending flanges 18 and 19. The flanges 18 and 19 are sealed to the lower outer edges of the rigid top and bottom walls 14 and 15 by bolts 21 and the flanges 12 and 13 are similarly sealed to the ends of the top and bottom walls by bolts 22.

Preferably the side walls 16 and 17, as well as the diaphragms 2 and 3, are reinforced with fabric 23, so as to minimize the stretching of these members.

Connected to the top wall 14 in communication with the dilatable compartment 24, defined by the top wall 14 and the upper diaphragm 2, is a pipe 25 by which the compartment 24 can be subjected to a differential pressure. Similarly connected to the bottom wall 15 in communication with the dilatable compartment 26, defined by the lower flexible diaphragm 3 and the rigid bottom wall 15, is a pipe 27 by which this compartment 26 may also be subjected to any desired pressure, either atmospheric, super-atmospheric or sub-atmospheric.

The only differences between the modification shown in Figs. 1, 2, 3 and 4 and that shown in Figs. 5, 6 and 7 is that in the former modification the diaphragms 2 and 3 normally assumed a closed position, as shown in Figs. 1 and 2; whereas in the latter modification the diaphragms 2 and 3 normally assume an open position, as shown in Figs. 5 and 6.

To this end the thickness of the diaphragms 2 and 3 of the first modification progressively decrease from their lateral edges to the central zone thereof; whereas in the second modification just the reverse is true, the diaphragms being thicker at their central zone than at their lateral edges.

In both modifications the thickness of the flexible side walls is uniform and in both modifications the diaphragms 2 and 3 merge with each other in reverse curves when the conduit defined thereby is in its open position.

When a fluid is introduced through the inlet pipe 7 into the valve shown in Figs. 1, 2, 3 and 4, it will dilate the diaphragms 2 and 3 into a partially or fully open position, depending upon the flexibility of the diaphragms and the resilient side walls 16 and 17 and upon the pressure differential between the inside of the conduit 1 and and the dilatable compartments 24 and 26. If the pressure within the conduit 1 is greater than that within the compartments 24 and 26, the conduit 1 will be dilated with a concurrent inward movement or collapse of the side resilient walls 16 and 17. Since the diaphragms 2 and 3 are thinner at their central zone, the conduit formed thereby will dilate progressively outward from this central zone. By properly diminishing the thickness of the diaphragm walls, the cross-sectional opening of the conduit can be maintained substantially circular so that, even though the opening is small, it will permit relatively large solid particles to pass therethrough.

As above stated, in the modification shown in Figs. 5, 6, and 7 the conduit 1 normally is in its fully open position with the side walls 16 and 17 collapsed inwardly. To close the valve a fluid is introduced through the pipes 25 and 27 into the dilatable compartments 24 and 26 under sufficient pressure to force the side walls 16 and 17 outwardly and progressively to close the diaphragms upon each other from their lateral edges inwardly. Here again by properly designing the diaphragms with respect to their progressively diminishing thickness, the conduit opening can be maintained substantially circular or elliptical in cross-section so as to permit the passage of relatively large particles.

Both modifications have in common a conduit formed by a pair of opposed flexible diaphragms which in the open position of conduit merge with each other at their lateral edges in reverse curves. In both modifications the thickness of the diaphragms progressively vary from their centers to their lateral edges so as to control the cross-sectional form of the resulting conduit. Obviously under a given pressure the thinner portions of the diaphragms will move before there is any movement of their thicker portions. The operation of both valves is aided by the movement of their side walls and depends upon the differential pressure existing between the inside and outside of the conduit.

This application is a continuation in part of my application Serial No. 578,722, filed February 19, 1945, now Patent 2,487,226.

I claim:

1. A valve of the character described comprising: a conduit defined by a pair of opposed flexible diaphragms sealed to each other along their lateral edges; resilient means for normally maintaining said diaphragms in their closed position; and means for moving the sealed lateral edges of said conduit in opposite directions.

2. A valve of the character described comprising: a conduit defined by a pair of opposed, symmetrical and flexible diaphragms formed integral with each other at their lateral edges and which in the open position of said conduit merge with each other in reverse curves; resilient means for normally maintaining said conduit in an open position; and means for establishing a differential fluid pressure between the interior and exterior of said conduit.

3. A valve of the character described comprising: a conduit defined by a pair of opposed, symmetrical and flexible diaphragms formed integral with each other at their lateral edges; flexible compartment side walls sealed intermediate their top and bottom edges to the lateral edges of said diaphragms; rigid top and bottom compartment walls sealed at their lateral edges to the top and bottom edges of said compartment side walls; means for sealing the ends of said side, top and bottom walls to said conduits so as to form with said conduit two opposed dilatable fluid chambers on the top and bottom thereof; and a fluid port in each of said chambers.

BYRON L. EASTMAN.

REFERENCES CITED

The following references are of record in the file of this patent:

UNITED STATES PATENTS

| Number | Name | Date |
|---|---|---|
| 994,167 | Koppitz | June 6, 1911 |
| 1,586,923 | Townsend | June 1, 1926 |
| 2,026,916 | Smith | Jan. 7, 1936 |
| 2,066,544 | Shaw | Jan. 5, 1937 |
| 2,371,434 | Eppler | Mar. 13, 1945 |
| 2,467,150 | Nordell | Apr. 12, 1949 |

FOREIGN PATENTS

| Number | Country | Date |
|---|---|---|
| 504,449 | Germany | Aug. 4, 1930 |
| 540,685 | Great Britain | Oct. 27, 1941 |